May 12, 1970 J. ISREELI 3,511,573
FLOW CELL STRUCTURE FOR PARTICLE COUNTING HAVING IMPROVED WASH
Filed Jan. 25, 1965 7 Sheets-Sheet 2
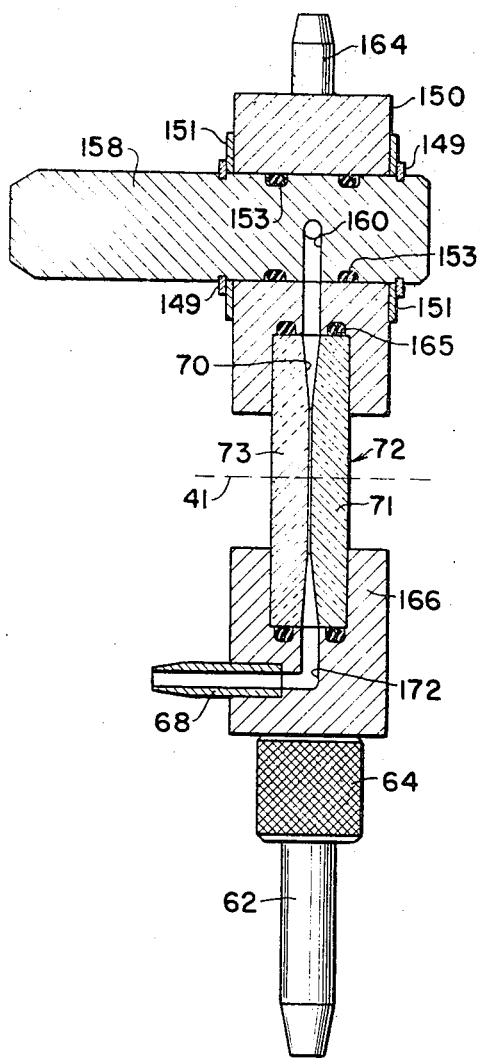
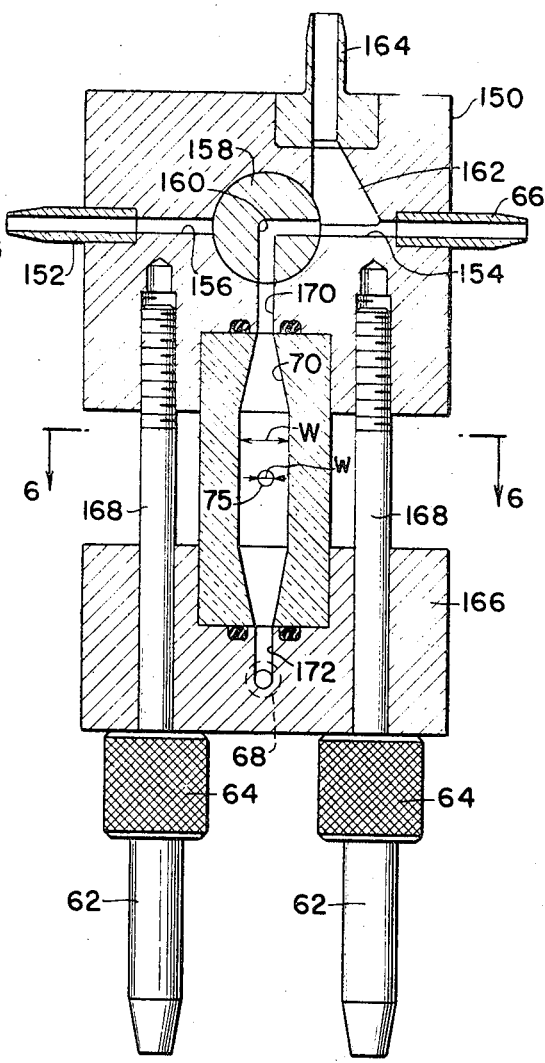
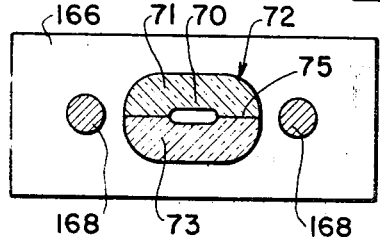
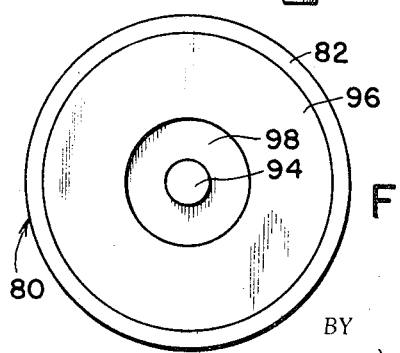
INVENTOR.
JACK ISREELI
BY
Harry Cohen
ATTORNEY

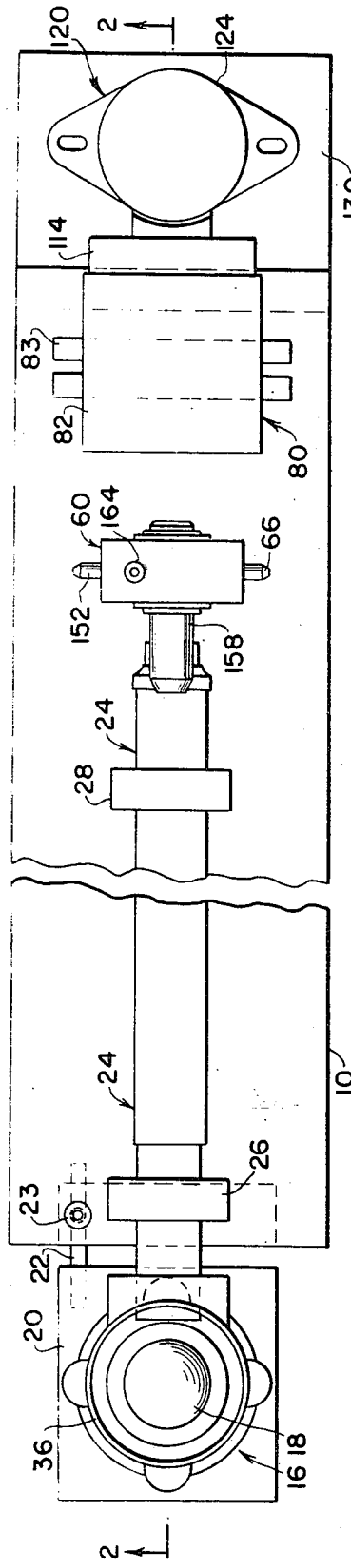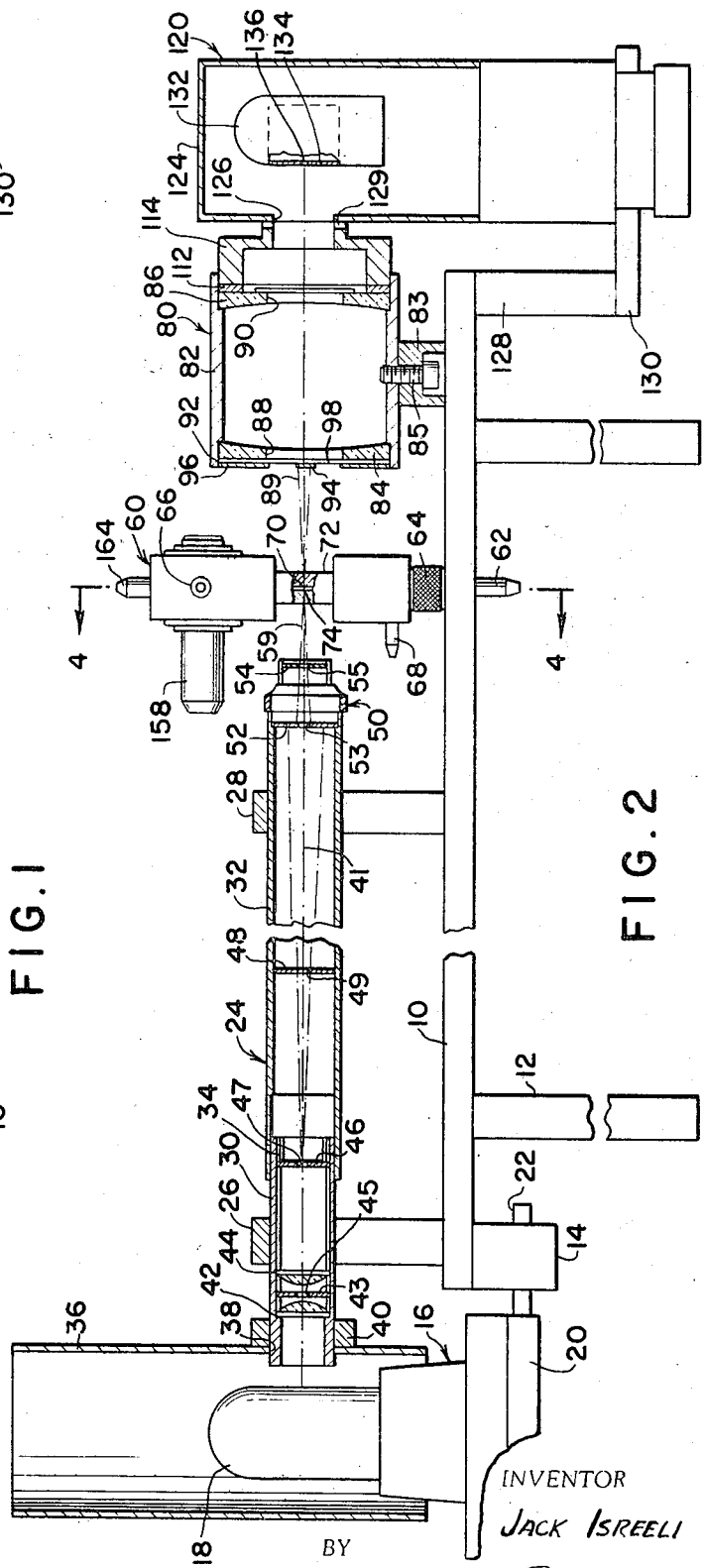

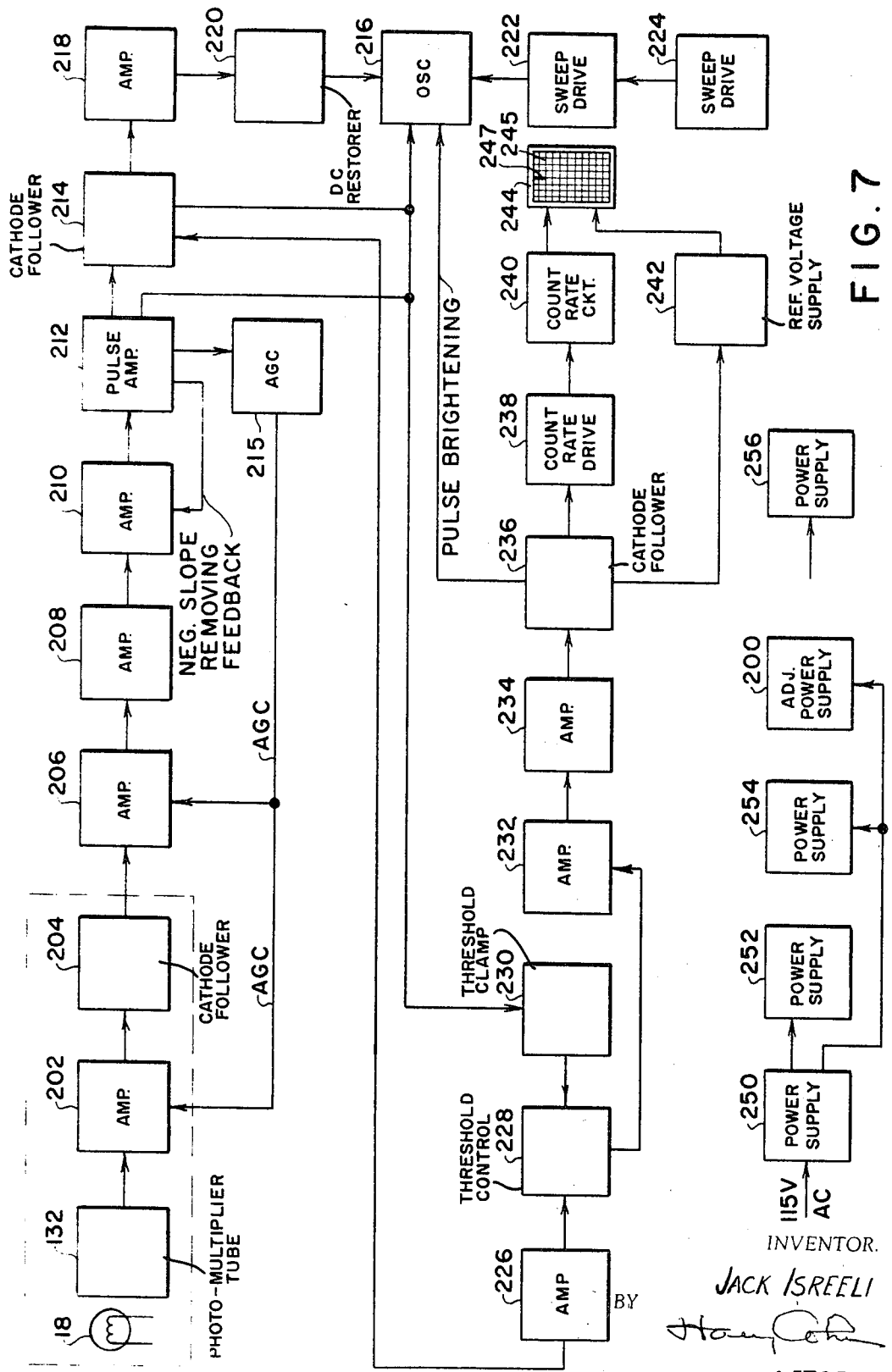

May 12, 1970  J. ISREELI  3,511,573
FLOW CELL STRUCTURE FOR PARTICLE COUNTING HAVING IMPROVED WASH
Filed Jan. 25, 1965  7 Sheets-Sheet 4
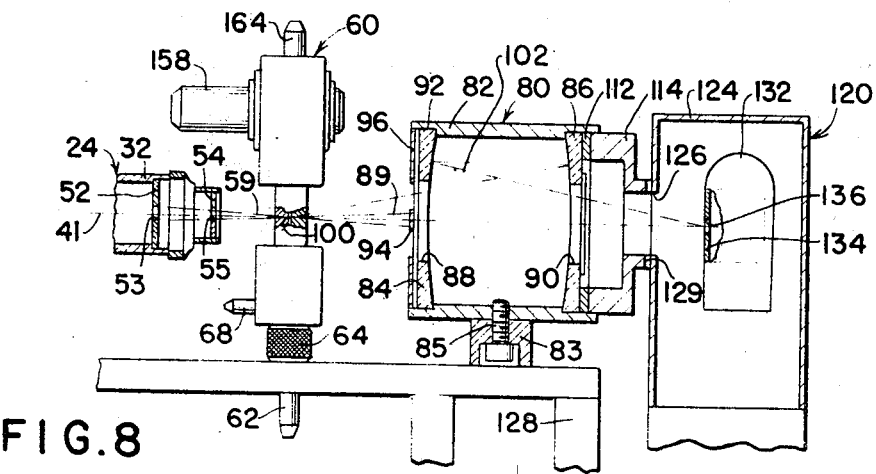

INVENTOR.
JACK ISREELI
BY
ATTORNEY

May 12, 1970 J. ISREELI 3,511,573
FLOW CELL STRUCTURE FOR PARTICLE COUNTING HAVING IMPROVED WASH
Filed Jan. 25, 1965 7 Sheets-Sheet 6
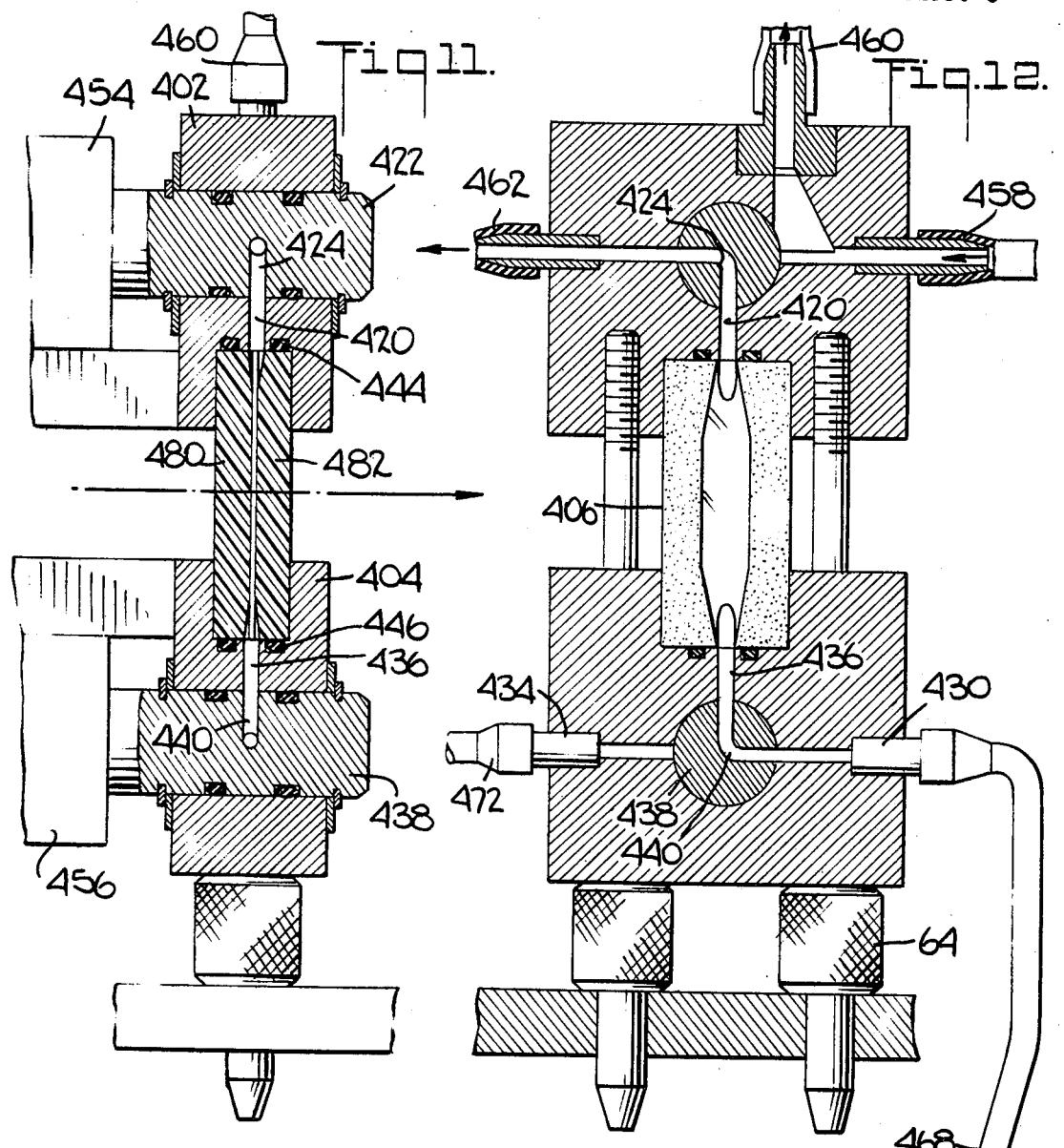
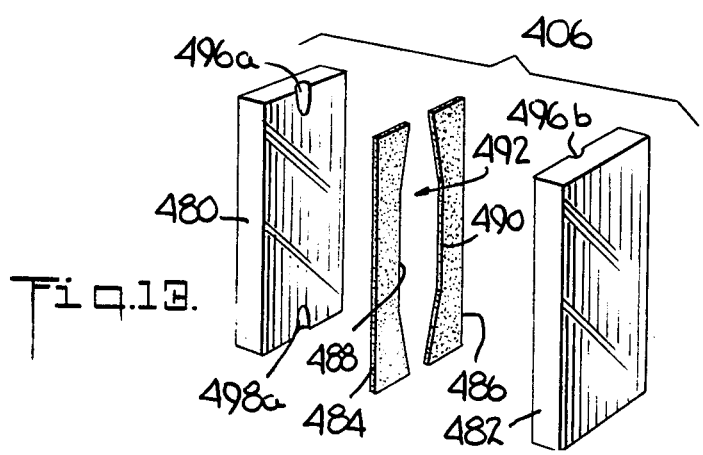
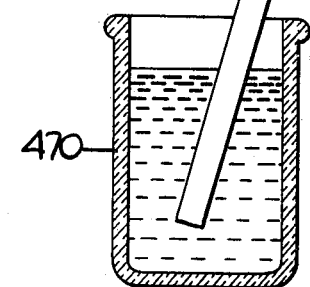
INVENTOR.
JACK ISREELI
BY
ATTORNEY

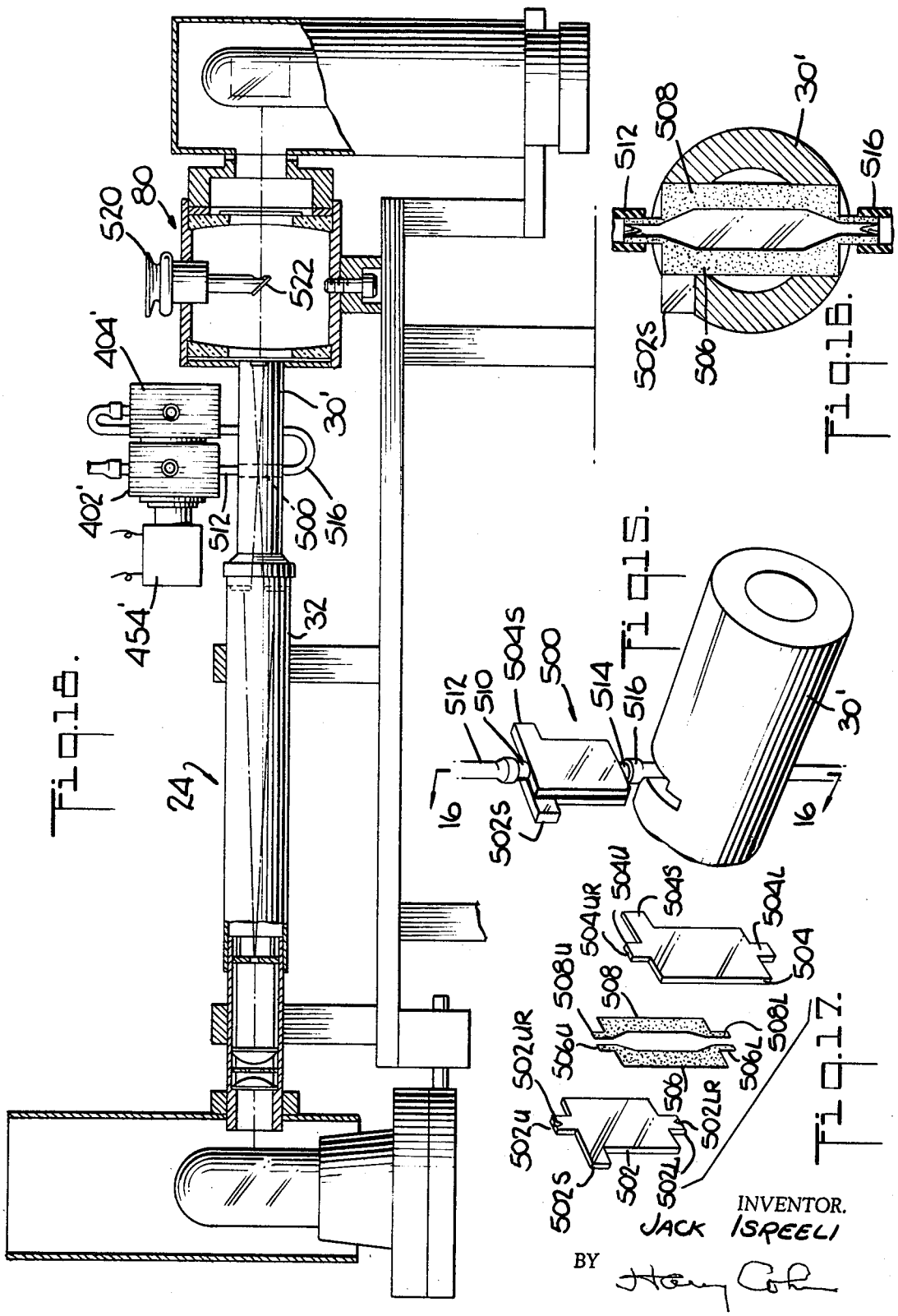

United States Patent Office 3,511,573
Patented May 12, 1970

3,511,573
FLOW CELL STRUCTURE FOR PARTICLE COUNTING HAVING IMPROVED WASH
Jack Isreeli, Mamaroneck, N.Y., assignor to Technicon Instruments Corporation, Chauncey, N.Y., a corporation of New York
Filed Jan. 25, 1965, Ser. No. 427,593
Int. Cl. G01n 21/06, 21/26, 21/16
U.S. Cl. 356—208                           10 Claims

ABSTRACT OF THE DISCLOSURE

A flow cell structure for counting particles suspended in a liquid wash, and for effecting automatic periodic cleansing of the flow cell passageway. A wash liquid and successive liquid samples are passed through the flow cell passageway intermittently and alternately in opposite directions.

---

This invention relates to an improved method and apparatus for counting the number of particles suspended in a fluid medium. A particular example of such a use is the counting of the number of red or white blood cells contained in a volume of diluted blood.

An object of this invention is the provision of an improved method and apparatus which makes possible the convenient and accurate counting of microscopic particles on a fully automatic basis.

Another object of this invention is the provision of an improved method and apparatus which makes possible the convenient and accurate counting of microscopic particles carried by a transparent fluid flowing at a constant volumetric rate, and which is independent of variation in particle size within a predetermined range of sizes.

Yet another object of this invention is the provision of an improved method and apparatus for particle counting including an improved sample flow cell and automatic periodic cleansing thereof without removal, whereby contamination of a succeeding sample portion by a preceding sample portion is minimized.

A feature of this invention is a flow cell means for a particle counting apparatus, which apparatus has illuminated optical means coupled to said flow cell for detecting the passage of individual particles therethrough and for providing an output light pulse signal in response thereto, electronic means coupled to said detecting means for receiving and totaling the number of pulses provided per unit time and providing an output signal responsive thereto, said flow cell means including an internal passageway having a substantial uniform surface without offset legs or angles therein, and means for automatically and periodically cleansing said chamber.

The above and other objects and advantages of the invention are believed made clear by the following description thereof taken in conjunction with the accompanying detailed drawings wherein:

FIG. 1 is a top plan view of the apparatus of the invention;

FIG. 2 is a vertical sectional view taken along plane 2—2 of FIG. 1;

FIG. 3 is a more detailed vertical sectional view of the flow cell assembly of the apparatus taken along plane 2—2 of FIG. 1;

FIG. 4 is a more detailed vertical sectional view of flow cell assembly of the apparatus taken along plane 4—4 of FIG. 2;

FIG. 5 is a front view of the collecting lens assembly of the apparatus;

FIG. 6 is a horizontal sectional view of the flow cell taken along plane 6—6 of FIG. 4;

FIG. 7 is a combined schematic and block diagram of the electronic counting and recording systems of the apparatus;

FIG. 8 is a vertical sectional view, similar to FIG. 2, of the flow cell, collecting lens, and photo-multiplier tube assemblies;

FIG. 9 is a diagrammatic illustration of the counting apparatus of the invention utilized in conjunction with an automatic sample supply apparatus;

FIG. 11 is a vertical sectional view of the assembly of FIG. 10 taken along plane 11—11 of FIG. 10;

FIG. 12 is a vertical sectional view of the embodiment of FIG. 10 showing the valves of the assembly in the reverse wash position;

FIG. 13 is a vertical, perspective, exploded view of the embodiment of the flow cell shown in FIG. 11;

FIG. 15 is a perspective view of yet another embodiment of the flow cell of FIG. 13;

FIG. 16 is a vertical sectional view of the flow cell of FIG. 14 taken along the plane 15—15 of FIG. 14;

FIG. 17 is a vertical, perspective, exploded view of the embodiment of the flow cell shown in FIG. 15; and FIG. 18 is an elevational view of another embodiment of the flow cell assembly and general apparatus which accommodates the flow cell of FIG. 14.

Figures 10, 14:
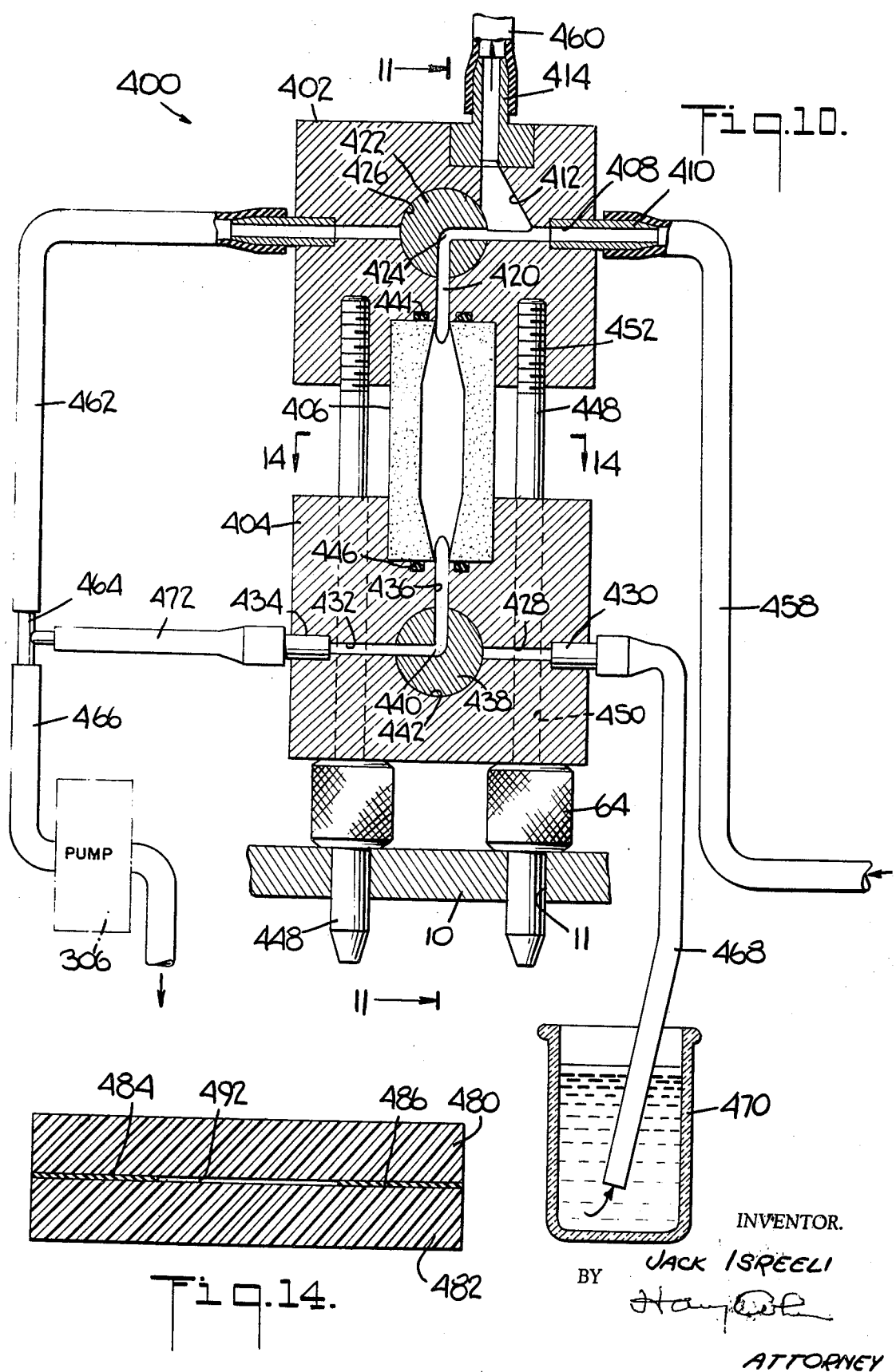
FIG. 10 is vertical sectional view of another embodiment of the flow cell assembly in another embodiment of the apparatus having provision for reverse washing of the flow cell, showing the valves of the assembly in the sample count position.
FIG. 14 is a plan view in section of the flow cell taken along plane 14—14 of FIG. 10.

Referring now to FIGS. 1 and 2, the apparatus comprises a main frame 10 with support legs 12 extending therefrom. A mounting block 14 is attached as shown (FIG. 2) to the underside of the main frame member 10, and includes a (non-illustrated) aperture formed therein. A lamp assembly is generally indicated at 16, and comprises a bulb 18 and a bulb support platform 20. A mounting shaft 22 extends as shown from the bulb-supporting platform through the non-illustrated aperture formed in mounting block 14 for the support of the lamp assembly from the main frame member 10. Holding means, as for example a set screw 23 (FIG. 1), may be provided to extend from the main frame member 10 through the mounting block 14 to cooperate with the portion of support shaft 22 which extends through the latter. Thus, the relative positions of the lamp assembly 16 and the main frame member 10 may be conveniently adjusted upon a loosening of the said set screw.

An optical tube 24 is adjustably positioned atop the main frame member 10 by adjustable support members 26 and 28, respectively, extending as shown therebetween. The adjustability of the optical tube relative to the said main frame member may be provided for in any convenient, well known manner, as for example, the mounting of one or more of the said support members for pivotal movement about its own longitudinal axis relative to the main frame member. Preferably, but not necessarily, the optical tube 24 comprises tube portions 30 and 32, respectively interconnected in the light tight telescoping manner illustrated at 34. A hollow, cylindrical light shield 36, including a light transmission aperture 38 formed therein and a correspondingly apertured support member 40 attached thereto is positioned as shown to surround the lamp 18 by the extension of one extremity of tube 30 through the apertures 40 and 38, respectively.

Two plano-convex collimating lenses 42 and 44 are spacedly positioned as shown in tube 30 adjacent the extremity thereof which projects through aperture 38 in the light shield 36; and an opaque, thin diaphragm 43, including a small aperture 45 formed in the central portion thereof is positioned as shown between the said lenses. Two similar diaphragms 46 and 48, with two similar apertures 47 and 49 formed in the respective central portions thereof are similarly positioned, adjacent the opposite extremity of tube 30, and within tube 32, respectively.

A highly corrected microscope objective 50 is positioned as shown at the extremity of tube 32 remote from tube 30. Diaphragms 52 and 54 are positioned as shown at the respective extremities of the microscope objective, and include small apertures 53 ad 55, respectively, formed therein.

The diaphragms 43, 46, 48, 52 and 54 are positioned so that the respective center points of each of the diaphragm apertures 45, 47, 49, 53 and 55 coincide with the optical axis of the optical tube 24. This axis is indicated by the dashed line 41 in FIG. 2. The most important of the apertures are the apertures 47 and 55, respectively, with the microscope objective 50 functioning to image aperture 47 at the focal point 74 thereof, and aperture 55 functioning to limit the angular extent of the light beam 59 projected from the said microscope objective. The remaining apertures, i.e., apertures 45, 49 and 53, function merely as light baffles to eliminate any stray light.

Thus light rays from lamp 18 will pass into tube 30 and be collimated by collimating lenses 42 and 44 into a parallel beam with only a narrow beam thereof passing through aperture 45 of diaphragm 43. The narrow beam will then pass in turn through apertures 47, 49 and 53 of diaphragms 46, 48 and 52, respectively, into the highly corrected microscope objective 50 for formation therewithin into a convergent beam and project therefrom through aperture 55 in diaphragm 54 as a convergent beam of a predetermined angular extent which is limited by the size of the aperture 55. For example, and not by way of limitation, the microscope objective may be of 5× magnification, and the respective diameters of the diaphragm apertures as follows: aperture 45 a diameter of .081", aperture 47 a diameter of .015", aperture 49 a diameter of .188", aperture 53 a diameter of .156", and aperture 55 a diameter of .094", whereby there will be provided a convergent beam 59 of approximately 8° extent projecting from the said microscope objective.

A flow cell 60 assembly including support legs 62 extending therefrom, is positioned on the main frame member 10 within the path of the convergent beam of light emanating from microscope objective 50, by the extension of the support legs 62 through suitable (non-illustrated) apertures formed in the said main frame member. Knurled, adjusting members 64 are threadably mounted on the said flow cell support legs to concurrently adjust the level of the cell relative to the said main frame member and the said convergent beam of light 59. The flow cell assembly is described in detail hereinbelow in conjunction with FIGS. 3 and 4, it being presently noted that the assembly contains a fluid inlet 66, a fluid outlet 68, and a flow passage 70 extending therebetween and through a transparent cell 72 of the assembly. The relative positions of the microscope objective 50 and the flow cell 60, and the angular extent of convergent beam 59, are predetermined to place the focal point 74 of the microscope objective within the portion of the flow passage 70 which extends through the transparent cell 72 of the assembly. This focal point should also lie along the optical axis 41 of the apparatus. Thus a small, generally circular area 75 (FIG. 4) of the transparent cell 72, and the flow passage 70 formed therein, will be illuminated by the incidence of the light beam 59 thereon. The diameter w of area 75, which area is the aperture 47 imaged on the flow cell by microscope objective 50 as discussed above, is preferably one-fifth that of the said aperture 47. Thus said area may readily be changed by the replacement of the diaphragm 46 with another diaphragm containing an aperture 47 of different diameter. Since the convergent beam 59 is of relatively narrow angular extent, the effects of misadjustment of the flow cell relative to the microscope objective will be minimized in that, even if the focal point 74 does not exactly coincide with the flow passage 70, the extent of the illuminated area 75 will not be significantly changed because of the narrowness of the beam.

With the area 75 thusly illuminated, microscopic particle-containing fluids may be concomitantly flowed through the flow passage 70, and the microscopic particles which flow through the illuminated area of the flow passage, i.e., that defined by area 75, will each function to interfere with the passage of the narrow light beam 59 therethrough, and will scatter a small portion of the beam outwardly in the manner depicted in FIG. 8.

A collector lens assembly is generally indicated at 80 and comprises an open-ended tubular member 82 positioned as shown on main frame member 10 by mounting bracket 83 and attachment screw 85 extending therebetween. Two generally circular, concave mirrors 84 and 86 are positioned as shown adjacent opposite extremities of the said tubular member 72, and include two generally circular apertures 88 and 90, respectively, formed in the central portions thereof. A generally circular thin glass plate 92 of excellent light transmission quality, and substantially the same diameter as the concave mirror 84, is positioned against the latter, as by cementing to the tubular member 82 at the extremity thereof adjacent the said mirror. The glass plate will thus function to maintain the mirror in the depicted position thereof, and to prevent the entrance of dust or similar atmospheric impurities through the adjacent open end into the interior of the tubular member 82.

Two disks 94 and 96 of any suitably opaque material, are each positioned on the said glass plate, as by cementing, in the manner best seen in FIG. 5 to leave an annular, unobstructed transparent portion 98 of the plate therebetween. Thus the only light which can enter the collecting lens assembly 80 must enter it through the annular transparent portion 98. The size of the disk 94 is predetermined so that all of the light from the microscope objective which converges at the focal point 74 on the flow cell passage 70 and diverges therefrom through the transparent cell 72, will in turn be absorbed by the disk in the absence of any interfering microscopic particles in the flow passage. Under such conditions, none of the light will enter the collecting lens assembly. This is the condition depicted in FIG. 2 wherein all of the light from the beam 89 which diverges from the flow cell 60 is absorbed by the said disk 94. Alternatively, as seen in FIG. 8, when a microscopic particle 100 is positioned in the flow cell passage 70 so as to interfere with the beam of light, the beam will be scattered outwardly by the particle, so that a small portion or ray thereof, indicated by a dashed line 102 in the subject figure, will project into the collecting lens assembly through the annular transparent portion 98 of the glass plate 92. Thus only the presence of a microscopic particle in the illuminated area of the flow cell passage 70 will result in the entry of a ray of light into the collecting lens assembly 80, and the reflection of the ray between concave mirrors 86 and 84 in the manner shown in FIG. 8.

A second, generally circular glass plate 112 of excellent light transmission quality, is positioned as shown in any convenient manner, as for example cementing, in abutting relationship with concave mirror 86 to cover the aperture 90 formed in the latter and thus keep atmospheric impurities from entering the interior of the collecting lens assembly in the same manner as glass plate 92.

A stepped, open-ended member 114 of generally cylindrical configuration is positioned as shown in telescoping relationship with tubular member 82, with one extremity of the former projecting into the latter for abutment with the adjacent surface of concave mirror 86 therewithin.

A photo-multiplier tube assembly is generally indicated at 120, and comprises a cylindrical, tube shield 124 mounted from the main frame member 10 by two vertical and horizontal mounting members 128 and 130 extending therebetween. An aperture 126 is formed in the cylindrical shield 124 in light transmitting registry with the adjacent extremity 129 of the stepped, open ended member 114. A photomultiplier tube 132 is positioned in any convenient manner within the said shield 124, and includes an opaque diaphragm 134 cemented thereto. An aperture 136 is formed in the diaphragm with the center thereof lying on the optical axis 41 of the apparatus.

Thus only light rays, as 102 in FIG. 8, from the convergent light beam 59 which are scattered outwardly by a microscopic particle, as 100, in the illuminated area 75 of the flow cell passtge 70 and projected into the collecting lens assembly 80 through the annular transparent portion 98 of the glass plate 92, will in turn be reflected by the concave mirrors 86 and 84 and focused thereby for operative impingement upon the surface of the photomultiplier tube 132 exposed by the aperture 136 in the diaphragm 134. Each of the rays may be considered a light pulse, and it is the function of the photo-multiplier tube assembly 120, and the electronic counter circuitry operatively associated therewith and described in detail hereinbelow in conjunction with FIG. 7, to total the number of such pulses received per unit time, and provide a count rate thereof indicative of the number of microscopic particles which flow through the illuminated area 75 of the flow cell passage 70 in the same unit time. Thus, with a constant predetermined flow rate, a known dilution of the microscopic particle-containing fluid, and an illuminated area 75 of a width $w$ (FIG. 4) of known percentage of the total width $w$ of the flow cell passage 70, only a simple calculation is required to transform the count rate into the number of microscopic particles per unit volume of a sample fluid. For example, and not by way of limitation, a dilution of 99 parts of diluent to one part of sample, a flow rate of one ounce per minute through the flow cell passage 70, a $w$ equal to $\frac{1}{4}$ $w$ and a count rate of 500 particles per second, would establish the sample as containing $12 \times 10^6$ microscopic particles per ounce.

Referring now to FIGS. 3 and 4, the flow cell assembly 60 comprises a valve block 150 with a sample liquid inlet nipple 66, and a wash liquid inlet nipple 152, projecting therefrom in registry with flow passages 154 and 156 respectively formed as shown in the valve block. A cylindrical valve member 158, including a generally L shaped flow passage 160 formed therein, is lap fitted within an aperture provided therefor in the valve block to resist leakage therearound. Washers 151 and retaining rings 149 are cooperatively associated as shown with the said valve block and the valve member to retain the same in the depicted relative positions thereof. O-rings 153 surround the valve member 158 to prevent leakage therearound.

A flow cell 72 of any suitable transparent material, as for example glass or a molded acrylic, is positioned as shown with one extremity thereof projecting into a complementary shaped aperture provided therefor in the valve block 150. A support block 166 supports the opposite extremity of the flow cell in a similar aperture, and is removably attached to the valve block 150 by two attachment screws 168 to maintain the flow cell 72 positioned therebetween. A flow passage 70 is formed as shown in the flow cell 72, and two flow passages 170 and 172 are formed respectively in the valve block 150 and support block 166 to communicate with the flow passage 70. The flow passage 170 connects the flow passage 70 with the flow passage 160 formed in valve member 158, while the flow passage 172 connects the flow passage 70 with the outlet nipple 68.

A de-bubbler passage 162, and an air outlet nipple 164 are positioned in the valve block 150 in communication with the sample liquid inlet passage 154. A valve member 158 is movable from a first position thereof as depicted in FIG. 4 wherein the flow passage 160 connects passages 154 and 170 to flow sample liquid through flow passage 70 of flow cell 72; to a second position thereof wherein flow passage 160 connects passages 156 and 170 to flow wash liquid through the said flow cell passage. With the said valve member in the second position thereof, sample liquids will, upon the introduction thereof at inlet nipple 66, simple flow out to waste through debubbler nipple 164.

In use, sample liquids are supplied under pressure to the inlet nipple 66, and drained from the flow cell by suction applied at outlet nipple 68. A greater volume will be introduced at inlet nipple 66 than is drained at outlet nipple 68, with the difference representing air which is removed from the sample liquid by the de-bubbler passage 162 and the nipple 164. De-bubbling is necessary to insure that air bubbles are not included in the sample liquid which flows through the illuminated area 75 of flow cell passage 70, because the effect thereof would be to temporarily drop the particle count rate to zero. O rings 165 are provided as shown around the flow cell 72 to prevent leakage from the flow passages 170, 70 and 172 escaping from the respective junctures thereof.

Alternating rotation of valve member 158 between the said first and second positions thereof described above will thus result in alternate slugs of de-bubbled sample liquid, and wash liquid, respectively, being supplied to the flow passage 70 of the flow cell 72. In a typical use, each of the slugs of sample liquid would be a discrete blood sample and the slug of wash liquid following it would function to remove the residue thereof from the flow passages within the flow cell assembly to prevent contamination thereby of the next succeeding discrete blood sample. Should the flow passage 70 in flow cell 72 become clogged with particulate matter, the latter may be removed for cleaning of the said passage by the simple loosening of the attachment screws 168 and resultant disassembly of the flow cell assembly. If the flow cell 72 is made of inexpensive molded acrylic, it may conveniently be discarded and a new one substituted therefor. If the said flow cell is of the more expensive glass variety, it may be cleaned by the insertion of a flat spring into the flow passage 70 to effect removal of the said particulate matter.

The flow cell 72 is of two piece construction as indicated in FIG. 6, comprising sections 71 and 73, respectively, joined together along the line 75 of surface contact therebetween in any convenient manner, as for example a suitable cement. Care must of course be taken in the manufacture of the flow cell that none of the cement enters the flow passage 70.

The electronic counting and recording system is schematically depicted in FIG. 7 in conjunction with the lamp 18 and the photo-multiplier tube 132. In operation, light from the lamp 18 which is reflected into the photo-multiplier tube 132 as pulses from the light scattered by the microscopic particles into annular transparent area 98, are converted by the tube into equivalent electrical pulse signals. The sensitivity of the photomultiplier tube 132 is conveniently adjustable through adjustable power supply 200, so that the apparatus may be adjusted for the accurate counting of microscopic particles within a wide range of sizes.

The pulse output from the photo-multiplier tube 132 is fed to a voltage amplifier 202 which provides a large increase in pulse amplitude, as for example a ten-fold increase. The gain of amplifier 202 will be controlled by an automatic gain control circuit in the counter unit. The use of automatic gain control is not essential to proper operation of the counting and recording system, but is useful in maintaining constant gain, so the depicted system and this explanation thereof include provision for automatic gain control.

A cathode follower 204 provides a low impedance output for the signal from the amplifier 202. A voltage amplifier 206 functions as the input to the counter unit, and the gain thereof is also controlled by the automatic gain control circuit, as for example, at ten. A tuned voltage amplifier 208 has a selective gain which tends to reject any 60 cycle stray pickup, and to amplify frequencies in a predetermined range, as for example, 500 c.p.s.–20 k.c.p.s. A voltage amplifier 210 is provided and the gain thereof is controlled by pulse amplifier 212 in such manner that the negative side of the output pulse is not amplified. The result of the inter-action of voltage amplifier 210 and the pulse amplifier 212 is that the resultant output pulses are all of approximately uniform pulse duration, which duration is much less than the time between pulses. A pulse amplifier 212 feeds the automatic gain control network 215 which responds to the average pulse amplitude at the output of the pulse amplifier 212. The automatic gain control network tends to maintain the overall gain of amplifiers 202, 206, 208, 210 and 212 constant, and the amount of automatic gain control action will be controlled by a manual non-illustrated gain control member.

A cathode follower 214 provides an output which serves as a threshold circuit reference and passes all pulses to an oscilloscope 216. The output from the cathode follower 214 is fed to a phase inverter and signal amplifier 218 which produces the vertical deflection signal for the oscilloscope 216; and a DC restorer 220 is provided to insure correct DC level for the vertical deflection plates of the oscilloscope. The proper threshold level is conveniently set by viewing the pulses on the oscilloscope to thus determine which pulses are of sufficient amplitude to be counted. Pulses which are being counted appear as brightened segments above the darkened threshold level on the oscilloscope, whereas pulses of insufficient amplitude do not cross above the threshold line and do not appear on the oscilloscope. Two conventional oscilloscope sweep drive circuits 222 and 224 are provided and function as indicated, while a DC amplifier 226 functions to adjust the threshold of the oscilloscope by means of a threshold control. The output of the amplifier 226 determines which pulses are of sufficient amplitude to pass through the DC threshold level control 228. A level control 228 and a threshold clamp 230 function to isolate DC levels and to pass the pulse output from pulse amplifier 212. The output from the level control 228 consists of only those pulses with an amplitude above the threshold level. Two pulse amplifiers 232 and 234 amplify these pulses.

A cathode follower 236 provides an output which functions to brighten the segment of the pulses which occur above the threshold level, for viewing on the oscilloscope. The output of the cathode follower 236 also drives a count rate driver 238 and a count rate circuit 240, the latter in turn providing a DC output proportional to the number of pulses per unit time. A recorder 244, including a driven chart 245 and a pen 247, of the null balancing circuit type, is connected to the count rate circuit, and a fixed reference voltage supply 242 utilized to supply the recorder slide wire. Thus, the result curves formed on chart 245 by pen 247 will directly indicate count rate, which is directly proportional to particle concentration in the manner set forth hereinabove.

Four power supplies 250, 252, 254, and 256 are of conventional design with the power supply 250 constituting a voltage stabilizing transformer, the power supply 252 a low voltage plate supply, the power supply 254 a high voltage supply to the cathode ray tube, and the power supply 256 supplying lamp 18.

Referring now to FIG. 9, the particle counting apparatus of the invention is generally indicated at 300, and is depicted in operative relationship with automatic blood sample supply apparatus indicated generally at 301. Briefly described, the sample supply apparatus comprises an indexable turntable 302 on which are supported a plurality of sample containers 304, each of which contains a discreet blood sample. A sample pick-up device 303, including a sample intake crook 305, is positioned as indicated adjacent the periphery of the turntable 302, with the crook movable into and out of the sample containers 304 as the latter are in turn indexed into position in alignment therewith by the said turntable.

A proportioning pump 306 includes four compressible pump tubes 308a, 308b and 308c and a plurality of pump rollers 309 movable thereover in the indicated direction. The pump tube 308a is connected at the inlet and thereof to a line 310 which is in turn connected to blood sample intake crook 305. The inlet end of the pump tube 308b is open to the atmosphere, while the inlet end of the pump tube 308c is connected to a reservoir 290 of a suitable blood sample diluent. Each of the pump tubes is connected at the outlet and thereof to a three branch fitting 291 which is in turn connected to a mixing coil 292. A line 312 connects the outlet end of the mixing coil to the sample inlet nipple 66 of the flow cell assembly 60. Thus concurrent operation of the turntable 302, the sample intake crook 305, and the proportioning pump 306, will result in the supply to fitting 291 of: a stream of discrete blood sample portions spaced by segments of air (the latter as a result of the up and down movement of the intake crook 305 in the atmosphere between sample contains 304) through line 310 and pump tube 308a; a stream of air through line 295 and pump tube 308b; and a continuous stream of diluent through line 293 and pump tube 308c. The discrete blood sample portions, air, and diluent will be thoroughly mixed in mixing coil 292 and supplied as a continuous stream of diluted and air segmented, discrete blood samples to the sample inlet nipple 66 of the flow cell assembly 60 through line 312.

A wash-liquid reservoir 316 is provided and connected as shown by line 318 to wash-liquid inlet nipple 152 of the said flow cell assembly.

It is assumed, for example, that the system of the subject, FIG. 9, is to be utilized in the continuous and automatic determination of the number of white blood cells per unit volume in each of a plurality of discrete samples of blood; each of the containers 304 would contain a discrete blood sample. Preferably, although not necessarily, the diluent contained in reservoir 290 would be a dilute solution of acetic acid and detergent which would function to both dilute the blood samples sufficiently to make the counting of the white blood cells practicable, and to lyse the red blood cells so that they will not be counted by the particle counting apparatus. A suitable wash-liquid for use in reservoir 316 would be a physiological saline solution.

A solenoid operated, rotary motion device of any well known and readily available construction is indicated at 320 and operatively connected to the flow cell assembly valve 158 as indicated by the dashed line extending therebetween. A mechanically operable switch 322 is operatively associated with the turntable 302 as indicated by the dashed line extending therebetween, and is electrically connected by lines 324 and 326 to the solenoid operated device 320, whereby the position of flow cell assembly valve 158 is controlled in precisely timed relationship to the operation of the turntable 302 and the sample supply device 303.

A multi-conductor cable 330 electrically connects the photo-multiplier tube assembly 120 and the electronic counting circuit, indicated diagrammatically at 332, with the circuit in turn electrically connected to recorder 244 by lines 336 and 338 connected therebetween.

Prior to use, the relative positions of one or more of the lamp 18, optical tube 24, flow cell assembly 60, collecting lens assembly 80 and photo-multiplier tube assembly 120 are adjusted, if necessary, to insure that the focal point of the convergent beam of light 59 from the microscope objective 50 (FIG. 2) falls within the flow passage 70 of the transparent flow cell 72 to illuminate a proper area 75 (FIG. 4) of the latter, and that any light pulses which do enter the collecting lens assembly 80 will be appropriately focused at aperture 136 of the photo-multiplier tube diaphragm 134. The photo-multiplier tube 132 and the counting circuit diagrammatically illustrated at 332 are then adjusted as regards the respective sensitivities thereof to insure that the tube and the circuit are sensitive to light pulses of the nature which will be generated by the passage of microscopic particles of the general white blood cell size range passing through flow cell passage 70.

Standard liquids of known particle concentration per unit volume, as for example resin suspensions, may then be passed through the flow cell assembly at the same constant flow rate referred to hereinabove through the use of a pump tube 308 and connecting line 312, so that the chart paper 245 of recorder 244 may be conveniently calibrated in terms of varying count rates, i.e. particles per second, each of which is exactly representative of the known particle per unit volume concentration referred to hereinabove.

Upon the completion of these preliminary steps, the containers 304 of the discrete blood samples, are inserted in the turntable 302 and the operation of the appartaus commenced. As the first diluted and air-segmented blood sample reaches the flow cell assembly 60, the valve 158 will be rotated, by the operation of switch 322 and solenoid operated rotary motion device 320, to the position thereof depicted in FIG. 4, whereby the diluted sample will commence to flow through the inlet nipple 66, the de-bubbler passage 162, the valve passage 160, the valve block passage 170, the transparent flow cell flow passage 70, and the support block passage 172 for withdrawal from the flow cell assembly under suction at the outlet nipple 68. Preferably the volume of the diluted blood sample, including any air intermixed therewith, supplied at sample inlet nipple 66 will be twice the volume withdrawn under suction at the outlet nipple 68, so that half of the total sample volume, including all of the air initially intermixed therewith, will flow to waste out of the de-bubbler nipple 164. Thus, as the de-bubbled blood sample flows through flow passage 70 of transparent flow cell 72, each white blood cell contained therein which passes through the illuminated area 75 (FIG. 4) will scatter a ray, or pulse, of light from convergent light beam 59 outwardly beyond the periphery of the opaque disk 94 to within the collecting lens assembly through the annular, transparent portion 98 of the glass plate 92. The light pulses will then be appropriately focused on the small exposed portion of the photo-multiplier tube and transduced into electrical pulses for determination of the white blood cells per unit time count rate of the counting circuit. The white cell count rate for the first blood sample will be scribed as curve 350a on the recorder chart 245, with the peak portion of the said curve serving to indicate directly the white blood cell per unit volume concentration of the said first blood sample on the pre-calibrated (as discussed hereinabove) recorder chart paper. After the expiration of a predetermined period of time during which the said first blood sample flows through the flow cell and is removed therefrom by aspiration through the outlet nipple 68 and the line 314, the switch 322 will actuate the rotary motion device 320 to shift the flow cell assembly valve 158 to the position thereof wherein the valve flow passage 160 connects the valve block passages 156 and 170, so that wash-liquid from reservoir 316 will be aspirated through the flow cell assembly, due to the reduced pressure conditions maintained at the outlet nipple 68, to cleanse the residue of the first blood sample therefrom. During this time any remaining portion of the first blood sample introduced to the flow cell assembly at the inlet nipple 66 will simply flow therefrom out of the said assembly through the de-bubbler nipple 164. At the expiration of a predetermined period of wash-liquid flow time which may, for example, be ten seconds as opposed to fifty seconds blood sample flow time, the valve 158 will be returned to the position thereof depicted in FIG. 4 so that the second blood sample will be flowed through the flow cell 72 and the white blood cell per unit time count rate thereof will be formed by recorder pen 247 as the curve 350b on the recorder chart 245. The low or substantially zero portion 352 between curves 350a and 350b represents the count rate during the period of time when the substantially cell-less wash liquid is flowing through flow cell flow passage 70.

The cell counting process is thus continued until each of the blood sample containers 304 has been indexed by turntable 302 into alignment with intake crook 305, and a portion of the blood sample aspirated therefrom and flowed through the flow cell for determination of the white blood cell per unit volume concentration thereof and formation of a result curve representative thereof on the recorder chart 245.

Another embodiment of the flow cell assembly is shown in FIG. 10. This flow cell assembly 400 comprises an upper valve block 402; a lower valve block 404, and a flow cell 406 mounted therebetween. The upper block includes a sample inlet 408 and an associated nipple 410, a de-bubbler outlet 412 and an associated nipple 414, a wash outlet 416 and an associated nipple 418, a flow cell inlet 420, and a valve element 422 having a 90° passageway 424 and mounted for rotation in a bore 426 through the block. The lower block includes a wash inlet 428 and an associated nipple 430, a sample outlet 432 and an associated nipple 434, a flow cell outlet 436, and a valve element 438 having a 90° passageway 440 and mounted for rotation in a bore 442 through the block. The ends of the flow cell 406 are disposed in suitable recesses formed in the valve blocks, and sealed by suitable O rings 444 and 446. The assembly is held together by two studs 448, each passing through a bore 450 in the lower block and threaded into a bore 452 in the upper block. Each stud has a lower projection for mounting in the main frame member 10 through suitable holes 11 therein, and a nut 64 for adjusting the height of the assembly 400 above the member 10.

A rotary solenoid 454 is mounted to the upper valve block and coupled to the valve element 422 for rotation thereof. A rotary solenoid 456 is mounted to the lower valve block and coupled to the valve element 438 for rotation thereof. Both solenoids are electrically coupled to the switch 322 which is actuated by the turntable 302 and sample supply device 303.

A conduit 458 is coupled between the sample mixing coil 292, or other source of sample which is fed by the pump 306, and the sample inlet nipple 410, to supply a stream of samples to the flow cell 406. A conduit 460 is coupled between the de-bubbler nipple 414 and a waste sump to remove air and sample excess from the sample stream. A conduit 462 is coupled between the wash outlet nipple 418, via a T coupling 464, and a conduit 466 which is engaged by the pump 306, and the waste sump, to remove wash liquid from the flow cell. A conduit 468 is coupled between a source of wash liquid 470 and the wash inlet nipple 430 to supply wash liquid to the flow cell in a direction opposite to the flow of sample fluid through the flow cell. A conduit 472 is coupled between the sample outlet nipple 434 and the T coupling 484 for conveying sample fluid from the flow cell to the waste sump.

The rotary solenoids are concurrently operated to alternatively position the valve elements so that, as shown in FIG. 10, a sample flows through the conduit 458, the passageway 425, down through the flow cell 406, through the passageway 440, through the conduits 472 and 466 to the waste sump. The air and surplus sample flows to waste through the conduit 460. Between each sample, the valve elements are moved to the alternate position, as shown in FIG. 12, so that the pump 306 causes a wash liquid to flow from the wash liquid source 470, through the conduit 468, through the passageway 440, up through the flow cell 406, through the passageway 424, and through the conduits 462 and 466 to the waste sump. The sample stream flowing through the conduit 548 is diverted through the debubbler outlet 412, and passes through the conduit 460 to the waste sump. By this arrangement the flow cell is reverse-flushed between each sample, and contamination by a preceding sample of a succeeding sample is precluded.

The flow cell 406, as shown in FIG. 13, is formed of four elements; two side plates 480 and 482, and two spacer plates 484 and 486. The proximal edges 488 and 490, respectively, of the spacer plates are cut away to form a central passageway 492 for the flow cell. The upper and lower ends of the two side plates 480 and 486, in juxtaposition are machined to form cone shaped recesses, which when the plates are separated, are divided along their axes to provide two semi-conical recesses 496a and 498a, respectively, in the plate 480, and two semi-conical recesses 496b and 498b, respectively, in the plate 482. The maximum diameter of each semi-conical recess is made equal to the minimum spacing between the edges 488 and 490, and equal to the diameter of the bores 420 and 436. The maximum spacing between the edges 488 and 490 is equal to W shown in FIG. 4. The side plates 480 and 482 are advantageously made of acrylic resin or polycarbonate, the spacer plates are advantageously made of pure vinyl film or acrylic resin, and these plates glued together by a solvent such as chloroform, methyl-ethyl-ketone, or acetone. The foregoing are merely exemplary, not to be considered limitative of the invention. The plates may be cut from sheet stock having a very smooth surface as sold by the manufacturer, the spacer plates being $\frac{2}{1000}$ to $\frac{4}{1000}$ inch thick, depending on the thickness of the flow cell central cavity 492 desired. The resulting flow cell 406 is similar in dimensions to the flow cell 72, and has smooth internal surfaces provided without elaborate and expensive machining.

Another modification of the flow cell is shown in FIGS. 15, 16 and 17. This flow cell 500 is similar to the flow cell 406 in being of four piece construction and having two side plates 502 and 504, and two spacer plates 506 and 508. Each side plate is made with an upper projection 502U and 504U respectively, a lower projection 502L and 504L respectively, and a side projection 502S and 504S respectively. Each spacer plate is made with an upper projection 506U and 508U respectively, and a lower propection 506L and 508L respectively. The upper and lower projections in juxtaposition, 502U and 504U, and 502L and 504L, respectively, are machined to form cone shaped recesses, which when the plates are separated are divided along their axes to provide two semi-conical recesses 502UR and 502LR, respectively, in the plate 502, and two semi-conical recesses 504UR and 504LR, respectively, in the plate 504. When the plates are glued together, in a manner similar to that described for FIG. 13, the projections 502S and 504S extend laterally in opposite directions as shown in FIG. 15. The composite upper projection consisting of 502U, 506U, 508U and 504U, is machined to an outer cylindrical surface to serve as a nipple 510 for a conduit 512, and the composite lower projection consisting of 502L, 506L, 508L and 504L, is machined to an outer cylindrical surface to serve as a nipple 514 for a conduit 516.

This embodiment of the flow cell 500, is advantageously used with valve blocks which are not necessarily located in line with the optical system as shown in FIG. 1, but rather, may be off set or remote from the optics. As shown in FIG. 18, the valve blocks are behind the optical system and the passageway 420 in the upper block 402′ leads to a nipple which is connected to the conduit 512, and the passageway 440 in the lower valve block 404′ leads to a nipple which is connected to the conduit 516. In this case the two valve blocks may on the same level, with the valve elements 422 and 438 coaxial and comprising a single member operated by a single rotary solenoid 454′. The optical tube assembly 24 now includes an additional tube 30′ which couples the tubes 32 and the mirror housing 80. A vertical slot is machined through the tube 30′ to accommodate and align the flow cell 500 therein. A removable ocular 520 having a 45° half silvered mirror 522 may be removably disposed within the mirror housing 80, for the purpose of visually checking the alignment of the optics and the flow cell.

In each of the embodiments shown, the flow cell has a cavity which provides a rectilinear vertical path for the sample, with no sharp changes in velocity, to preclude the deposit or entrapment of contaminants from a sample passing therethrough. Further, in each embodiment the light beam passes through planar media, that is, the front surface of one side plate is parallel to the rear surface thereof, which is parallel to the front surface of the other side plate, which is parallel to the rear surface thereof; thus the fluid flowing therethrough also has parallel front and rear surfaces.

Inventive features shown and described in this application, but not claimed herein, are claimed in the copending application of Seymour Rosin, Ser. No. 347,769, filed Feb. 27, 1964, and assigned to the assignee of this application.

While there has been shown and described several preferred embodiments of the invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. A flow cell assembly for counting particles suspended in a sample fluid, including: a flow cell having an unobstructed fluid passageway; a source of sample fluid; a source of wash fluid; first means for transmitting the sample fluid as a stream through said flow cell passageway in one direction; second means for transmitting the wash fluid as a stream through said flow cell passageway in the other direction; third means, coupled to said first and second means, for rendering said first and second means effective intermittently and alternately to pass sample fluid and wash fluid, respectively, through said flow cell passageway; and means for detecting particles suspended in sample fluid transmitted through said unobstructed passageway.

2. A flow cell assembly for a plurality of fluid samples, comprising: a flow cell having an unobstructed fluid passageway; first means for supplying the samples successively as a stream of fluid; second means for supplying a wash fluid as a stream of fluid; third means, coupled to said first means and to opposite ends of said flow cell passageway, for transmitting the sample stream of fluid through said flow cell in one direction; fourth means, coupled to said second means and coupled to opposite ends of said flow cell passageway, for transmitting the wash stream of fluid through said flow cell in the other direction; and fifth means, coupled to said third and fourth means, for rendering said third and fourth means effective intermittently and alternately such that wash fluid is passed through said flow cell in said other direction between successive samples; and means for detecting particles suspended in sample fluid transmitted through said unobstructed passageway.

3. A flow cell assembly for counting particles suspended in each of a plurality of fluid samples, comprising: a flow cell having an unobstructed passageway for fluids with two ends; intermittently operated first means for supplying the samples successively as a stream of fluid; second means for supplying a wash fluid as a stream of fluid; valve means having a first inlet coupled to said first means, a second inlet coupled to said second means, a first outlet coupled to one of said ends of said flow cell passageway for fluids and a second outlet coupled to the other of said ends of said flow cell passageway for fluids; intermittently operated third means coupled to said first means and said valve means for actuating said valve means to render said first inlet and said first outlet of said valve means operable to pass said samples through said flow cell passageway in a first direction, and said second inlet and said second outlet of said valve means operable, intermittently and alternately, once for each sequential sample, in phase with the intermittent operation of said first means to pass said wash fluid through said flow cell passageway in a second direction opposite to said first direction; and means for detecting particles suspended in sample fluid transmitted through said unobstructed passageway.

4. A flow cell assembly as defined in claim 1 wherein said flow cell passageway has an elongated substantially rectangular cross section.

5. A flow cell assembly as defined in claim 1 wherein the dimensions of said flow cell passageway in one direction is substantially reduced compared to the dimensions of said flow cell passageway in a direction transverse to said one direction.

6. A flow cell assembly as defined in claim 1 wherein said means for detecting further includes means for passing a light beam through said flow cell passageway in one direction, and means responsive to said light beam passing through said flow cell passageway for detecting the passage of particles suspended in the sample fluid being passed through said flow cell passageway.

7. A flow cell assembly as defined in claim 6 wherein the cross sectional area of said light beam is substantially less than the cross sectional dimensions of said flow cell passageway in said one direction.

8. A flow cell assembly as defined in claim 2 wherein said first means includes additional means for supplying said sample fluid as a continuous stream wherein successive individual samples are separated by an inert fluid, and said third means includes means for removing said inert fluid from said continuous stream prior to passage of said sample fluid through said flow cell passageway.

9. A flow cell assembly as defined in claim 2 wherein said second means includes a conduit having one end immersed in a wash liquid reservoir, and said second outlet of said valve means is connected to pump means to aspirate wash liquid from said reservoir through said flow cell.

10. A flow cell assembly as defined in claim 3 wherein said valve means includes first and second valve members, said first valve member defining said first inlet and said first outlet of said valve means, said second valve member defining said second inlet and said second outlet of said valve means, each of said valve members being operative to connect respective inlets and outlets in flow communication with opposite ends of said passageway, respectively.

References Cited

UNITED STATES PATENTS

| | | | |
|---|---|---|---|
| 851,388 | 4/1907 | Wallace | 210—411 |
| 893,070 | 7/1908 | Gobbi | 210—411 |
| 1,945,839 | 2/1934 | Maltitz | 210—411 |
| 2,617,940 | 11/1952 | Giguere | 356—206 X |
| 2,621,557 | 12/1952 | Kauanagh | 356—40 |
| 2,716,371 | 8/1955 | Still | 356—72 X |
| 2,797,149 | 6/1957 | Skeggs | 23—230 |
| 2,819,402 | 1/1958 | Watson | 356—246 X |
| 2,858,727 | 11/1958 | Stamm et al. | 356—208 X |
| 2,954,472 | 9/1960 | Frenzel | 356—246 X |
| 3,008,370 | 11/1961 | Uribe | 356—40 |
| 3,047,367 | 7/1962 | Kessler | 23—230 |
| 3,084,592 | 4/1963 | Scott | 356—208 |
| 3,090,861 | 5/1963 | Haenni | 356—246 X |
| 3,177,706 | 4/1965 | Shuman et al. | 73—61 |
| 3,234,846 | 2/1966 | Cropper et al. | 356—208 X |

FOREIGN PATENTS

| | | |
|---|---|---|
| 381,209 | 9/1923 | Germany. |
| 170,115 | 6/1951 | Germany. |

RONALD L. WIBERT, Primary Examiner

W. A. SKLAR, Assistant Examiner

U.S. Cl. X.R.

23—253; 210—411; 250—222; 356—244